US010728487B2

(12) United States Patent
Yasuta

(10) Patent No.: US 10,728,487 B2
(45) Date of Patent: Jul. 28, 2020

(54) IMAGE DISPLAY APPARATUS, EXTERNAL DEVICE, IMAGE DISPLAY METHOD, AND IMAGE DISPLAY SYSTEM

(71) Applicant: SHARP KABUSHIKI KAISHA, Sakai, Osaka (JP)

(72) Inventor: Akira Yasuta, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/351,883

(22) Filed: Mar. 13, 2019

(65) Prior Publication Data
US 2019/0215476 A1 Jul. 11, 2019

Related U.S. Application Data

(62) Division of application No. 15/947,671, filed on Apr. 6, 2018, now Pat. No. 10,271,002.

(30) Foreign Application Priority Data

Apr. 14, 2017 (JP) .................................. 2017-080693

(51) Int. Cl.
*H04N 5/45* (2011.01)
*H04N 21/462* (2011.01)
(Continued)

(52) U.S. Cl.
CPC ............ *H04N 5/45* (2013.01); *G06F 3/1438* (2013.01); *G09G 5/00* (2013.01); *G09G 5/14* (2013.01);
(Continued)

(58) Field of Classification Search
CPC .. H04N 5/44543; H04N 5/44513; H04N 5/45; H04N 21/4316; H04N 21/4622; G09G 5/00
(Continued)

(56) References Cited

U.S. PATENT DOCUMENTS 4,952,785 A 8/1990 Kikuda
2002/0075407 A1* 6/2002 Cohen-Solal ............ H04N 5/45
348/565
(Continued)

FOREIGN PATENT DOCUMENTS

CN 101626443 A 1/2010
CN 103597812 A 2/2014
(Continued)

OTHER PUBLICATIONS

Notice of Allowance and Fee(s) Due dated Dec. 14, 2018 for U.S. Appl. No. 15/947671.

*Primary Examiner* — Sherrie Hsia
(74) *Attorney, Agent, or Firm* — ScienBiziP, P.C.

(57) ABSTRACT

An image display apparatus includes an image reception unit that receives image data from an external device, a display unit that displays an image related to the image data, a setting changing unit that changes, in accordance with an instruction determined in advance, a setting determined in advance, an image determination unit that determines whether or not a prescribed pattern determined in advance is included in the image related to the image data, a storage unit that holds the instruction in association with the prescribed pattern in advance, and a control unit that, when the image determination unit determines that the prescribed pattern is included in the image related to the image data, causes the setting changing unit to change the setting in accordance with the instruction associated with the prescribed pattern.

7 Claims, 8 Drawing Sheets

(51) Int. Cl.
*H04N 21/431* (2011.01)
*H04N 21/485* (2011.01)
*G06F 3/14* (2006.01)
*G09G 5/14* (2006.01)
*G09G 5/00* (2006.01)

(52) U.S. Cl.
CPC ..... *H04N 21/4316* (2013.01); *H04N 21/4622* (2013.01); *H04N 21/4858* (2013.01); *G09G 2370/12* (2013.01); *G09G 2370/16* (2013.01); *G09G 2370/20* (2013.01)

(58) Field of Classification Search
USPC ....... 348/563–565, 567, 569, 584, 586, 588, 348/598
See application file for complete search history.

(56) References Cited

U.S. PATENT DOCUMENTS

| | | | |
|---|---|---|---|
| 2008/0049141 A1* | 2/2008 | Fukui | H04N 5/45 348/565 |
| 2010/0007915 A1 | 1/2010 | Ogino et al. | |
| 2014/0125696 A1 | 5/2014 | Newton et al. | |
| 2017/0140190 A1 | 5/2017 | Xu et al. | |

FOREIGN PATENT DOCUMENTS

| | | |
|---|---|---|
| CN | 104917764 A | 9/2015 |
| CN | 104966015 A | 10/2015 |
| EP | 0289047 A2 | 11/1988 |
| JP | 3532304 B2 | 5/2004 |
| JP | 2010-004486 A | 1/2010 |

\* cited by examiner

IMAGE DISPLAY APPARATUS, EXTERNAL DEVICE, IMAGE DISPLAY METHOD, AND IMAGE DISPLAY SYSTEM

BACKGROUND

1. Field

The present disclosure relates to an image display apparatus, an external device, an image display method, and an image display system.

2. Description of the Related Art

An existing function of, in a case where one or more external devices such as personal computers (PCs) are connected to an image display apparatus such as a display apparatus, switching videos or images (hereinafter, "images") input from two or more external devices or an image input from one or more external devices and an image of a main body of the image display apparatus and displaying the images in one screen of a display unit of the image display apparatus has been known. There also have been known a Picture By Picture (PBP) function of arranging and displaying such images in two or more small screens, a Picture In Picture (PIP) function of displaying a small screen in a large main screen, and the like.

In a case where an operation of changing an image input from an external device is performed in the image display apparatus having such functions, the operation is generally performed directly by an operation key, a touch panel, or the like of the image display apparatus or performed by an attached remote controller.

However, a method of directly operating the image display apparatus is not convenient for a user of an external device installed in a place apart from the image display apparatus. In a case of an operation method using the remote controller as well, it is difficult for the user to perform the operation immediately unless the remote controller is on hand, so that the user needs to ask another user to pass the remote controller. Further, in a case where the image display apparatus to which the external device is connected or the attached remote controller has a type different from a type with which the user is familiar, there may be a problem that the user needs to newly learn an operation method.

On the other hand, as a method of changing an image without directly operating the image display apparatus or using the attached remote controller or the like, for example, an information processing apparatus that includes an image combining unit configured to, in a case where a command input from an interface is identified as a command to specify a change of an image, output an image signal of an image, which is obtained by combining an image that is newly displayed on a display screen of a display apparatus in response to the command and an image that is currently displayed on the display screen, to the display apparatus is disclosed (for example, refer to Japanese Unexamined Patent Application Publication No. 2010-004486).

By using such a command to specify a change of an image, the external device is able to directly perform an operation of changing an input image for the image display apparatus, so that a direct operation of the image display apparatus or an operation of changing the image by using the remote controller is not necessary.

However, in a case where an image change by a command is performed, it is necessary to construct a network by the RS-232C, the Ethernet, or the like in advance and construct a system for command control. In particular, in a case where a plurality of external devices are connected to the image display apparatus by different connection methods, it is necessary to construct a system according to the respective connection methods, thus causing a problem that the system is very complicated.

SUMMARY

The disclosure is made in view of such circumstances and provides an image display apparatus, an image display method, and an image display system that enable an external device to easily change a setting without using a special system for command control.

According to an aspect of the disclosure, there is provided an image display apparatus including: an image reception unit that receives image data from an external device; a display unit that displays an image related to the image data; a setting changing unit that changes, in accordance with an instruction determined in advance, a setting determined in advance; an image determination unit that determines whether or not a prescribed pattern determined in advance is included in the image related to the image data; a storage unit that holds the instruction in association with the prescribed pattern in advance; and a control unit that, when the image determination unit determines that the prescribed pattern is included in the image related to the image data, causes the setting changing unit to change the setting in accordance with the instruction associated with the prescribed pattern.

According to an aspect of the disclosure, there is provided an image display method including: receiving image data from an external device and displaying an image related to the image data; receiving a prescribed pattern associated with an instruction related to a change of a setting determined in advance; determining whether or not the prescribed pattern is included in the image related to the image data; and, when it is determined in the determining that the prescribed pattern is included, changing the setting in accordance with the instruction associated with the prescribed pattern.

According to an aspect of the disclosure, there is provided an image display system including an external device and an image display apparatus, in which the external device includes: an input operation unit that receives an input operation from a user; a prescribed pattern generation unit that generates, on a basis of the input operation, a prescribed pattern associated with an instruction for the image display apparatus in advance; a device display unit that displays an image; a device image processing unit that generates a superimposing image in which the prescribed pattern is superimposed with the image; an image output unit that outputs image data related to the superimposing image to the image display apparatus; and a device control unit that controls the input operation unit, the prescribed pattern generation unit, the device display unit, the device image processing unit, and the image output unit, and the image display apparatus includes: an image reception unit that receives image data output from the external device; a display unit that displays an image related to the image data; a setting changing unit that changes a setting determined in advance; an image determination unit that determines whether or not the prescribed pattern is included in the image related to the image data; a storage unit that holds the instruction in association with the prescribed pattern in advance; and a control unit that controls the image reception unit, the display unit, the setting changing unit, the image determination unit, and the storage unit. When the input operation unit receives an input operation indicating that an instruction for the image display apparatus is to be transmitted, the device control unit causes the prescribed pattern generation unit to generate the prescribed pattern associated with the instruction in advance, causes the device image processing unit to generate a superimposing image in which the prescribed pattern is superimposed with the image, and causes the image output unit to output image data related to the superimposing image to the image display apparatus, and, when the image determination unit determines that the prescribed pattern is included in the image related to the image data, the control unit causes the setting changing unit to change the setting in accordance with the instruction associated with the prescribed pattern.

BRIEF DESCRIPTION OF THE DRAWINGS

FIGS. 3A and 3B are explanatory views illustrating an outline of an image switching operation for an image to be displayed on a display unit of an image display apparatus according to the disclosure, in which FIG. 3A illustrates an example where images input from external devices are subjected to PBP display on the display unit of the image display apparatus in the image display system according to the disclosure and FIG. 3B illustrates a case where an image that is displayed in a small screen and an image that is displayed in a large screen are switched for display in the display unit of the image display apparatus of FIG. 3A;

DESCRIPTION OF THE EMBODIMENTS

Hereinafter, the disclosure will be described in more detail with reference to drawings. Note that the following description is to be construed as illustrative and not limitative in all respects.

Embodiment 1

<Configuration of image display system 100>

An image display system 100 according to Embodiment 1 of the disclosure will be described.

Note that, though a case of switching of an image will be exemplarily described in the following embodiment as an example of a change of a setting that is determined in advance, the disclosure is applicable not only to switching of an image but also to setting of contrast, luminance, or the like of an image and a change of an image such as rotation of the image.

The disclosure is also applicable not only to setting of an image but also to setting of increasing or decreasing a sound volume or switching MUTE or a color mode, and setting of turning on or off setting of a network.

A configuration of the image display system 100 of the disclosure will be described with reference to FIGS. 1 and 2.

Figure 1:
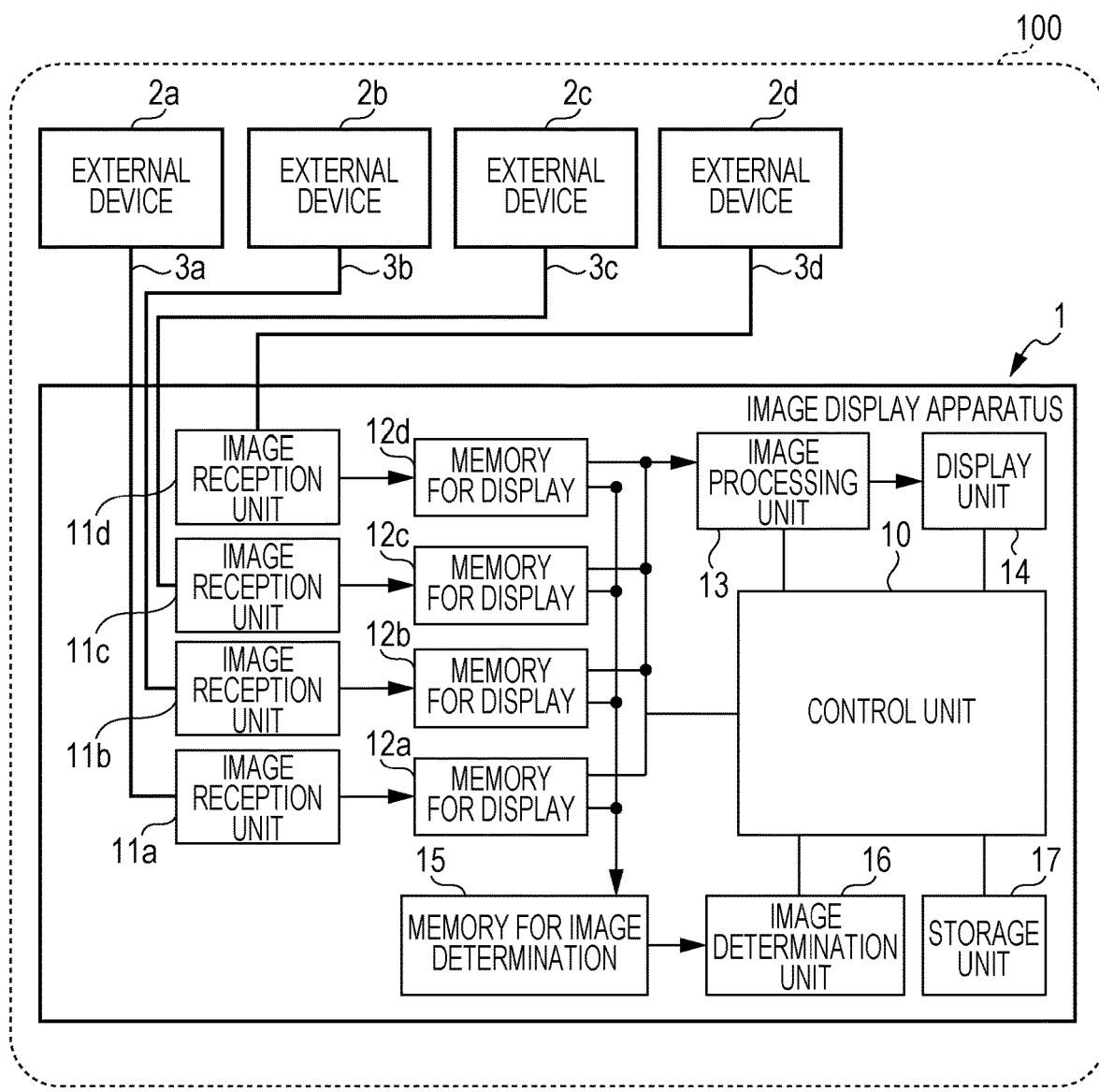
FIG. 1 is a block diagram illustrating a schematic configuration of an image display system according to the disclosure.
Figure 2:
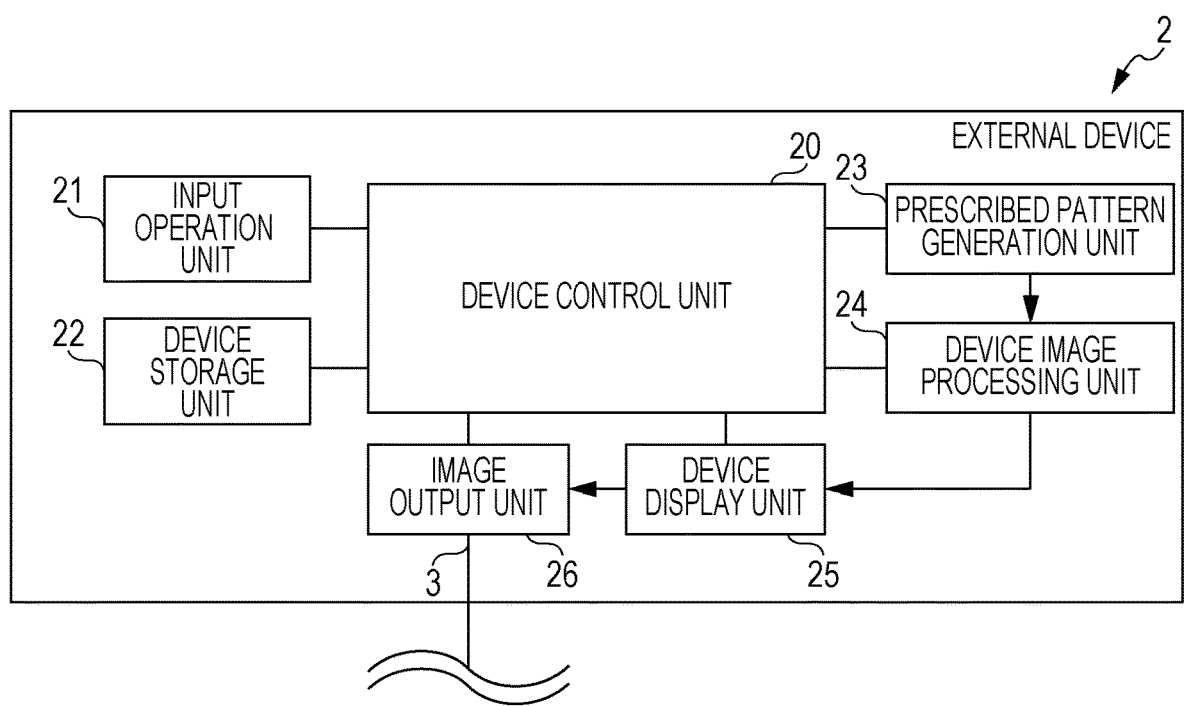
FIG. 2 is a block diagram illustrating a schematic configuration of an external device according to the disclosure.

FIG. 1 is a block diagram illustrating a schematic configuration of the image display system 100 according to the disclosure and FIG. 2 is a block diagram illustrating a schematic configuration of an external device 2 according to the disclosure.

The image display system 100 is constituted by an image display apparatus 1 and two or more external devices 2a to 2d, and the two or more external devices 2a to 2d are respectively connected to image reception units 11a to 11d of the image display apparatus 1 through image cables 3a to 3d.

Note that, the image display system 100 is not limited to be constituted by the two or more external devices 2a to 2d and may be constituted by the image display apparatus 1 and one external device 2, for example.

The image display apparatus 1 is an apparatus that displays an image or video (hereinafter, simply referred to as an "image") such as a moving image, a still image, or a 3-D image, and examples thereof include displays of a television, a personal computer (PC), a public display, a digital signage display, a monitor, and an electronic black board.

The image display apparatus 1 may have a touch panel function of allowing an operation through touching a screen.

The image display apparatus 1 has a function of switching images input from the two or more external devices 2a to 2d for PBP or PIP display on a display unit 14.

As illustrated in FIG. 1, the image display apparatus 1 of the disclosure mainly includes a control unit 10, the image reception units 11a to 11d, memories for display 12a to 12d, an image processing unit 13, the display unit 14, a memory for image determination 15, an image determination unit 16, and a storage unit 17.

Components of the image display apparatus 1 illustrated in FIG. 1 will be described below.

The control unit 10 is a circuit mainly constituted of a microprocessor, and is an arithmetic device that performs processing of controlling various devices, and processing of an operating system, application software, or the like. Moreover, an ASIC (Application Specific Integrated Circuit), which is an integrated circuit designed and produced for a specific purpose, or a circuit having other arithmetic functions may be included as a peripheral circuit.

The image reception units 11a to 11d are parts for respectively receiving image signals input from the external devices 2a to 2d through the image cables 3a to 3d and a not-illustrated video input terminal.

Examples of types of image signals include image signals of an analog input terminal such as a VGA terminal or a component terminal, a digital input element such as a DVI terminal, an HDMI (registered trademark) terminal, or a DisplayPort terminal, and a video input terminal of a control system such as a USB connector.

Further, the image reception units 11a to 11d may receive image signals transmitted in a wireless manner using Bluetooth (registered trademark), a wireless LAN, or the like without being limited to receive image signals transmitted in a wired manner.

The memories for display 12a to 12d are parts for respectively storing image data received by the image reception units 11a to 11d.

The image processing unit 13 is a part for performing processing of generating a divided image, a PIP (Picture in Picture) image, or the like on the basis of the image data stored in the memories for display 12a to 12d.

The image processing unit 13 also performs processing, for example, such as image adjustment, color correction, γ correction, double speed processing, OSD generation, or OSD superimposition.

The display unit 14 is a part for displaying an image processed by the image processing unit 13.

The display unit 14 is constituted by, for example, a CRT display, a liquid crystal display, an EL display, or the like, and is a display device, such as a monitor or a line display, used for an operating system or application software to display electronic data such as a processing state.

The display unit 14 may have a display surface covered by a touch panel to allow a touch panel operation by detecting a position of a fingertip or the like of a user contacting the display surface.

The memory for image determination 15 is a part for temporarily storing the image data, which is stored in the memories for display 12a to 12d, for determination by the image determination unit 16.

The image determination unit 16 is a part for determining whether or not the image data stored in the memory for image determination 15 includes a prescribed pattern SP determined in advance.

The storage unit 17 is a part for holding, for example, programs and other data of control processing for various components of the image display apparatus 1, an operating system of the image display apparatus 1, application software installed on the image display apparatus 1, and the like.

The storage unit 17 also holds an image switching instruction, which is determined in advance, in association with the prescribed pattern SP determined in advance.

Next, the external devices 2a to 2d illustrated in FIG. 1 are devices that are connected to the image display apparatus 1 and output image signals. Examples of the external devices 2a to 2d include devices of personal computers (PCs), mobile terminals such as smartphones or tablets, DVD recorders, and televisions.

In the following description, the external devices 2a to 2d are collectively called the external device 2.

As illustrated in FIG. 2, the external device 2 of the disclosure mainly includes a device control unit 20, an input operation unit 21, a device storage unit 22, a prescribed pattern generation unit 23, a device image processing unit 24, a device display unit 25, and an image output unit 26, and the image output unit 26 is connected to the image display apparatus 1 through an image cable 3.

Components of the external device 2 illustrated in FIG. 2 will be described below.

The device control unit 20 is a part for controlling each unit of the external device 2 and has a similar configuration to that of the control unit 10.

The input operation unit 21 is a part for transmitting an instruction or the like from the user to the device control unit 20 by an operation of an electronic icon through a touch panel or an operation of a physical key with respect to an operating system of the external device 2 or application software installed on the external device 2.

The device storage unit 22 is a part for holding, for example, programs and other data of control processing for various components of the external device 2, the operating system of the external device 2, the application software installed on the external device 2, and the like.

The prescribed pattern generation unit 23 is a part for generating, on the basis of the instruction from the input operation unit 21, a prescribed pattern SP that is associated in advance with an image switching instruction related to an operation of switching two or more screens subjected to PBP/PIP display on the display unit 14 of the image display apparatus 1.

As the prescribed pattern SP that is generated, there is a one-dimensional code such as a bar code, a two-dimensional code such as a QR code (registered trademark), or the like. The prescribed pattern SP may be a code or geometric design in which specific numerals, characters, signs, and the like are combined.

Note that, the prescribed pattern generation unit 23 may not be a part that is incorporated in the external device 2 in advance and may be configured, for example, by installing an application program related to an image switching operation of the image display apparatus 1 on the external device 2 and starting an application.

The device image processing unit 24 is a part for processing an image, which is to be displayed on the device display unit 25, to be suitable for an output and superimposing the prescribed pattern SP generated by the prescribed pattern generation unit 23 with the image.

The device display unit 25 is a part for performing display of the image processed by the device image processing unit 24 and has a similar configuration to that of the display unit 14.

The image output unit 26 is a part for outputting an image signal to the image display apparatus 1 through the image cable 3.

Though not illustrated, the image display apparatus 1 includes, for example, an operation unit that receives an instruction from the user, an input terminal unit that is connected to a terminal of the external device 2, such as an analog input terminal such as a VGA terminal or a component terminal, a DVI terminal, an HDMI terminal, or a DisplayPort (DP) terminal, and inputs an image signal from the external device 2, a non-volatile memory that stores necessary information for achieving various functions of the image display apparatus 1, such as static text of a control program, log information, user setting information, or system information, a volatile memory that temporarily stores various data and is used also as a working area or the like for a program, a timer that counts lapse time of various processing of the image display apparatus 1, a light receiving unit that receives an infrared (IR) signal from a remote controller, and a communication unit that performs communication in a wired or wireless manner with the external device 2 and transmits or receives image data or the like.

<Procedure of Image Switching Operation of Image Display Apparatus 1 from External Device 2>

Next, an outline of an image switching operation of the image display apparatus 1 from the external device 2 will be described with reference to FIGS. 3A and 3B.

Figure 3A:
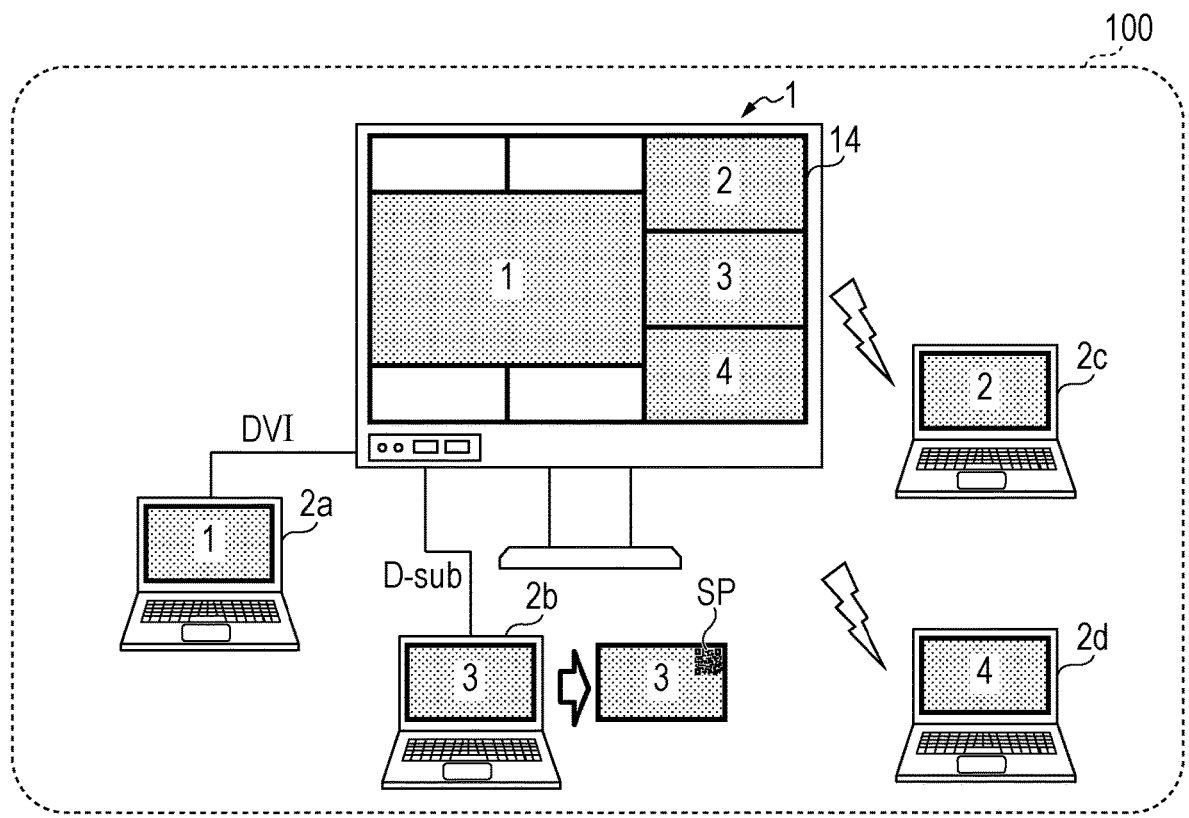
Figure 3B:
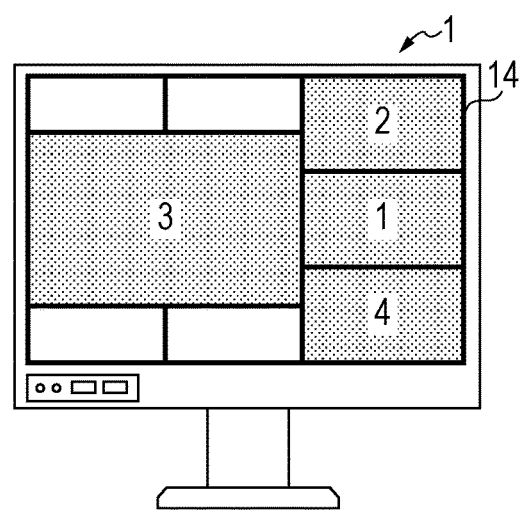

FIGS. 3A and 3B are explanatory views illustrating an outline of an image switching operation for an image displayed on the display unit 14 of the image display apparatus 1 according to the disclosure. FIG. 3A illustrates an example where images input from the external devices 2a to 2d are subjected to PBP display on the display unit 14 of the image display apparatus 1 in the image display system 100 according to the disclosure and FIG. 3B illustrates a case where an image 3 that is displayed in a small screen and an image 1 that is displayed in a large screen are switched for display in the display unit 14 of the image display apparatus 1 of FIG. 3A.

As illustrated in FIG. 3A, assumed is a case where images 1 to 4 that are input from the external devices 2a to 2d in a wired or wireless manner are subjected to PBP display on the display unit 14 of the image display apparatus 1.

In FIG. 3A, the image 1 from the external device 2a is displayed in the large screen on a left side of the display unit 14 and the images 2 to 4 from the external devices 2b to 2d are displayed in small screens in order from an upper side on a right side of the display unit 14.

Note that, one or more external devices 2 connected to the image display apparatus 1 may include a device on which an application program related to the image switching operation of the image display apparatus 1 is not installed or a device that does not include the device display unit 25.

Here, it is assumed that a user of the external device 2b intends to display the image 3 instead of the image 1 in the large screen on the display unit 14 as illustrated in FIG. 3B.

At this time, in the existing manner, the image 3 is generally displayed in the large screen by performing an operation of switching the images by an operation unit (not illustrated) of the image display apparatus 1 or an attached remote controller, but it is not convenient for the user when the external device 2b is at a position apart from the image display apparatus 1 or when the remote controller is not on hand.

Thus, in Embodiment 1 of the disclosure, the user of the external device 2b displays a prescribed pattern SP that is determined in advance to superimpose with an image displayed on the device display unit 25 of the external device 2b and transmits image data related to the image including the prescribed pattern SP to the image display apparatus 1.

The prescribed pattern SP is associated in advance with an image switching instruction for an image to be displayed on the display unit 14 of the image display apparatus 1, and when receiving image data related to the image including the prescribed pattern SP, the image display apparatus 1 performs an image switching operation based on the image switching instruction.

As described above, it is possible to realize the image display system 100 that is able to display the image 3 in the large screen through an image input from the external device 2 without using a special system for command control.

Next, procedure of an image switching operation in the external device 2 for an image to be displayed on the display unit 14 of the image display apparatus 1 according to the disclosure will be described with reference to FIGS. 4 and 5A to 5C.

Figure 4:
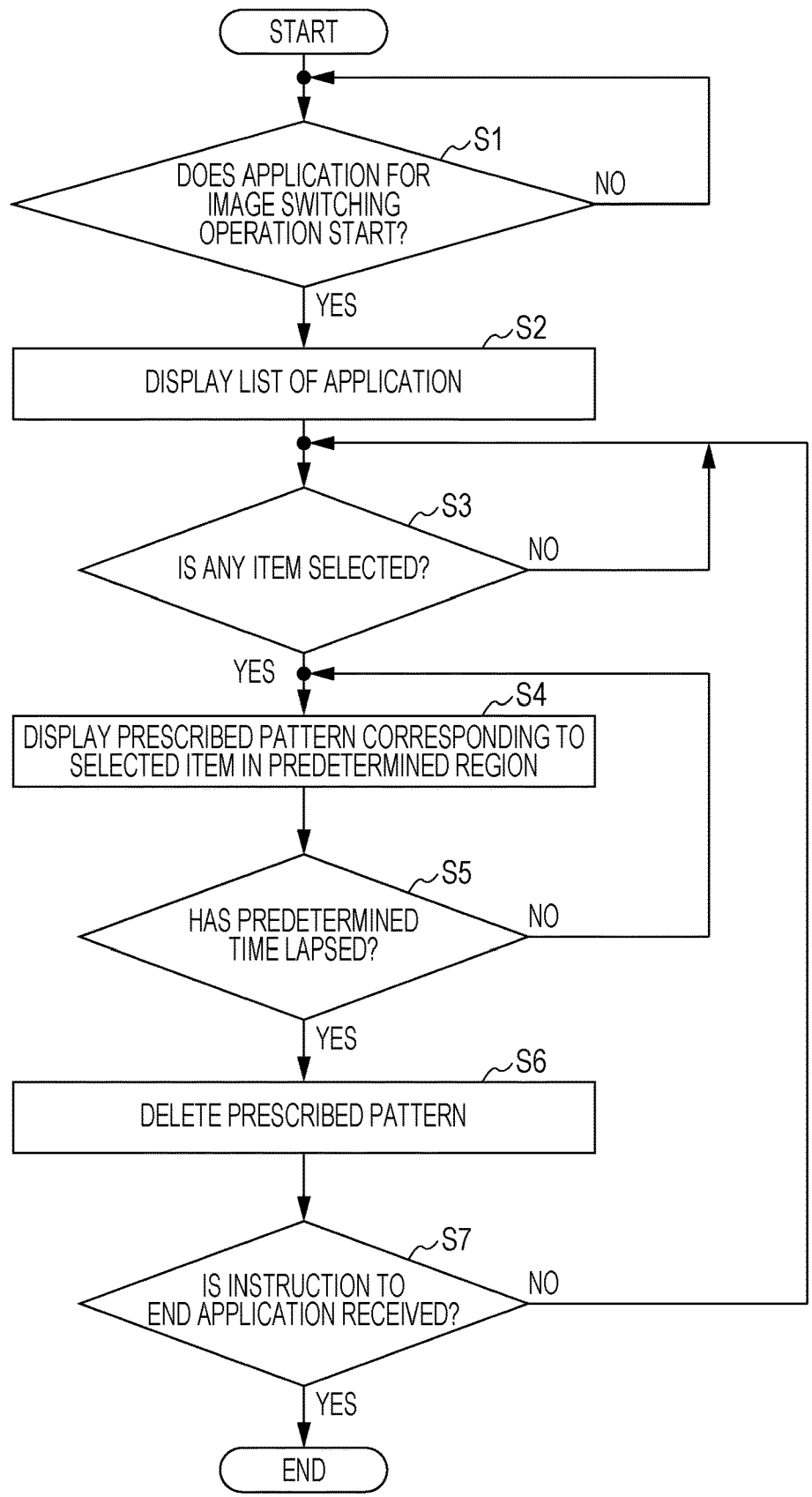
FIG. 4 is a flowchart illustrating procedure of an image switching operation in an external device for an image to be displayed on the display unit of the image display apparatus according to the disclosure.
Figure 5A:
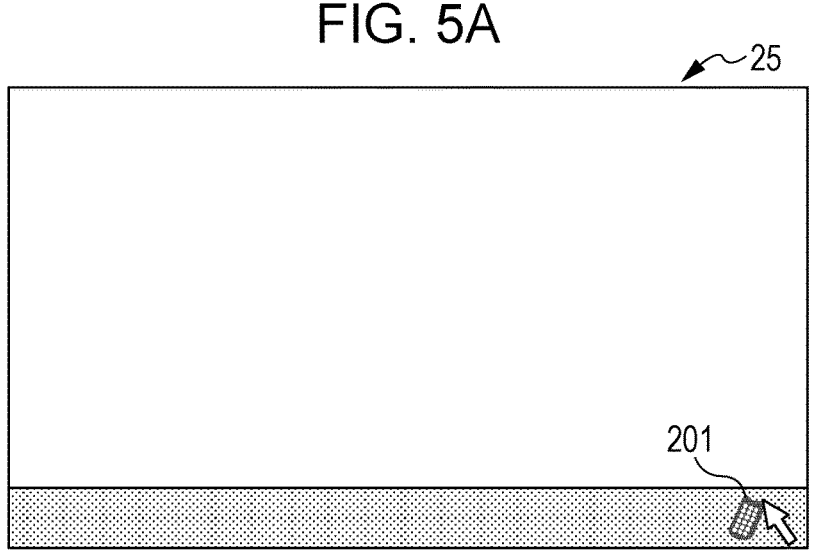
FIGS. 5A to 5C are explanatory views illustrating a specific example of the image switching operation in the external device for the image to be displayed on the display unit of the image display apparatus according to Embodiment 1 of the disclosure and illustrating a series of procedure of the image switching operation in the external device.
Figure 5B:
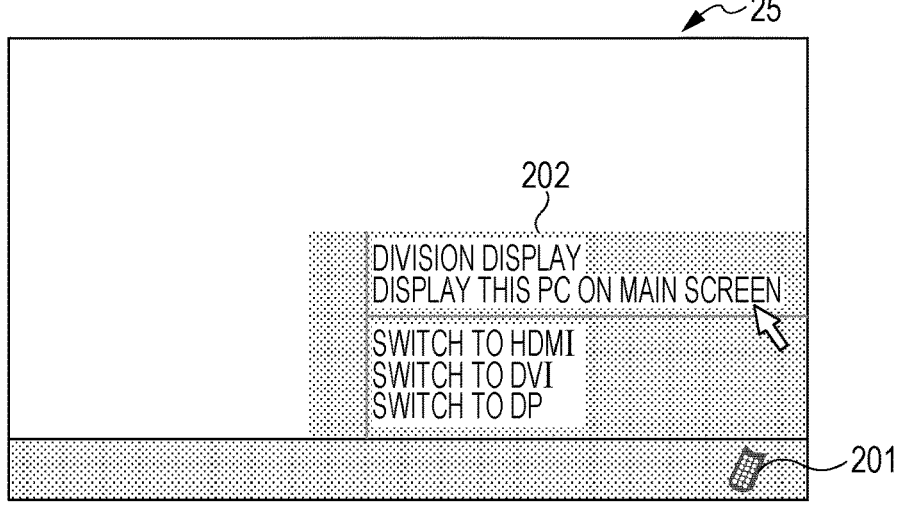
Figure 5C:
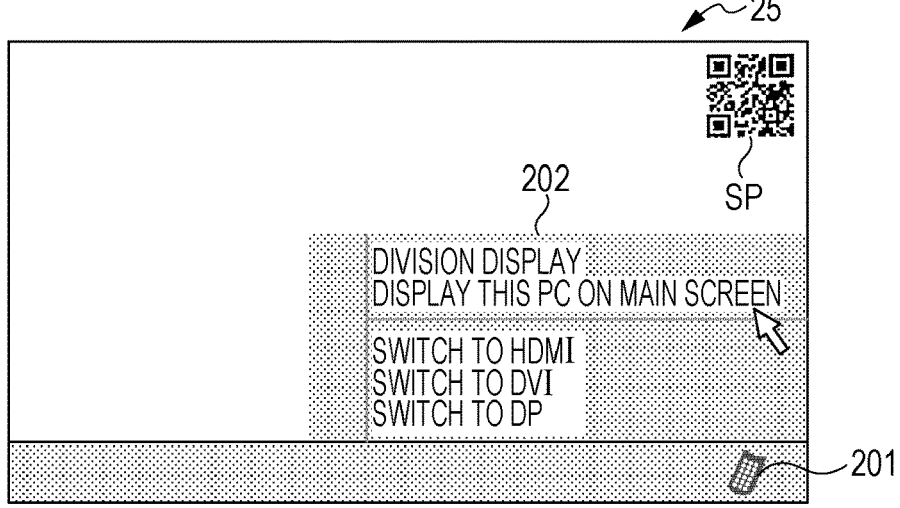

FIG. 4 is a flowchart illustrating procedure of the image switching operation in the external device 2 for the image to be displayed on the display unit 14 of the image display apparatus 1 according to the disclosure. FIGS. 5A to 5C are explanatory views illustrating a specific example of the image switching operation in the external device 2 for the image to be displayed on the display unit 14 of the image display apparatus 1 according to Embodiment 1 of the disclosure and illustrating a series of procedure of the image switching operation in the external device 2.

In Embodiment 1, it is assumed that the user installs in advance an application program for switching an input of the image to be displayed on the display unit 14 of the image display apparatus 1 on the external device 2 to be connected to the image display apparatus 1.

When the application is installed, an icon 201 for starting the application is displayed in a task bar at a bottom part of the device display unit 25 of the external device 2 as illustrated in FIG. 5A.

At step S1 of FIG. 4, the device control unit 20 of the external device 2 determines whether or not the application for the image switching operation starts (step S1).

In a case where the application starts (in a case where Yes is determined at step S1), the device control unit 20 causes the device display unit 25 to display a list 202 of the application at step S2 (step S2). Then, the device control unit 20 performs determination of step S3 (step S3).

On the other hand, in a case where the application does not start (in a case where No is determined at step S1), the device control unit 20 repeats the determination of step S1 (step S1).

Specifically, as illustrated in FIG. 5B, when the icon 201 is activated, the list 202 for an operation of the application is displayed in a predetermined region of the device display unit 25.

The list 202 is displayed immediately above the icon 201 in FIGS. 5B and 5C, but may be displayed in another region.

In the list 202, items of "division display", "display this PC on main screen", "switch to HDMI", "switch to DVI", and "switch to DP" are displayed in order from an upper side.

Note that, the items of the list 202 are not limited to the items described above and may include an item different from the aforementioned items in accordance with a function of the image display apparatus 1.

Next, at step S3, the device control unit 20 determines whether or not any item is selected from among the items displayed in the list 202 (step S3).

In a case where any of the items is selected (in a case where Yes is determined at step S3), the device control unit 20 displays, in a predetermined region of the device display unit 25, a prescribed pattern SP corresponding to the selected item at step S4 (step S4). Then, the device control unit 20 performs determination of step S5 (step S5).

On the other hand, in a case where any of the items is not selected (in a case where No is determined at step S3), the device control unit 20 repeats the determination of step S3 (step S3).

Specifically, as illustrated in FIG. 5C, when the user selects the item of "display this PC on main screen", the prescribed pattern SP corresponding to the item is displayed in an upper right region (for example, such as a region with 100 dots×100 dots at an upper right corner) of the device display unit 25.

Note that, the display region of the prescribed pattern SP is not limited to the upper right region of the device display unit 25 and may be at any place.

Next, at step S5, the device control unit 20 determines whether or not a predetermined time (for example, three seconds) has lapsed after displaying the prescribed pattern SP on the device display unit 25 (step S5).

In a case where the predetermined time has lapsed (in a case where Yes is determined at step S5), the device control unit 20 deletes the prescribed pattern SP from the device display unit 25 at step S6 (step S6). Then, the device control unit 20 performs determination of step S7 (step S7).

On the other hand, in a case where the predetermined time has not lapsed (in a case where No is determined at step S5), the device control unit 20 repeats the processing of step S4 (step S4).

Next, the device control unit 20 determines whether or not an instruction to end the application is received at step S7 (step S7).

When receiving the instruction to end the application (Yes is determined at step S7), the device control unit 20 ends the processing of the image switching operation (step S7).

On the other hand, when not receiving the instruction to end the application (No is determined at step S7), the device control unit 20 repeats the determination of step S3 (step S3).

Next, procedure of the image switching operation in the image display apparatus 1 for the image to be displayed on the display unit 14 of the image display apparatus 1 according to Embodiment 1 of the disclosure will be described with reference to FIG. 6.

Figure 6:
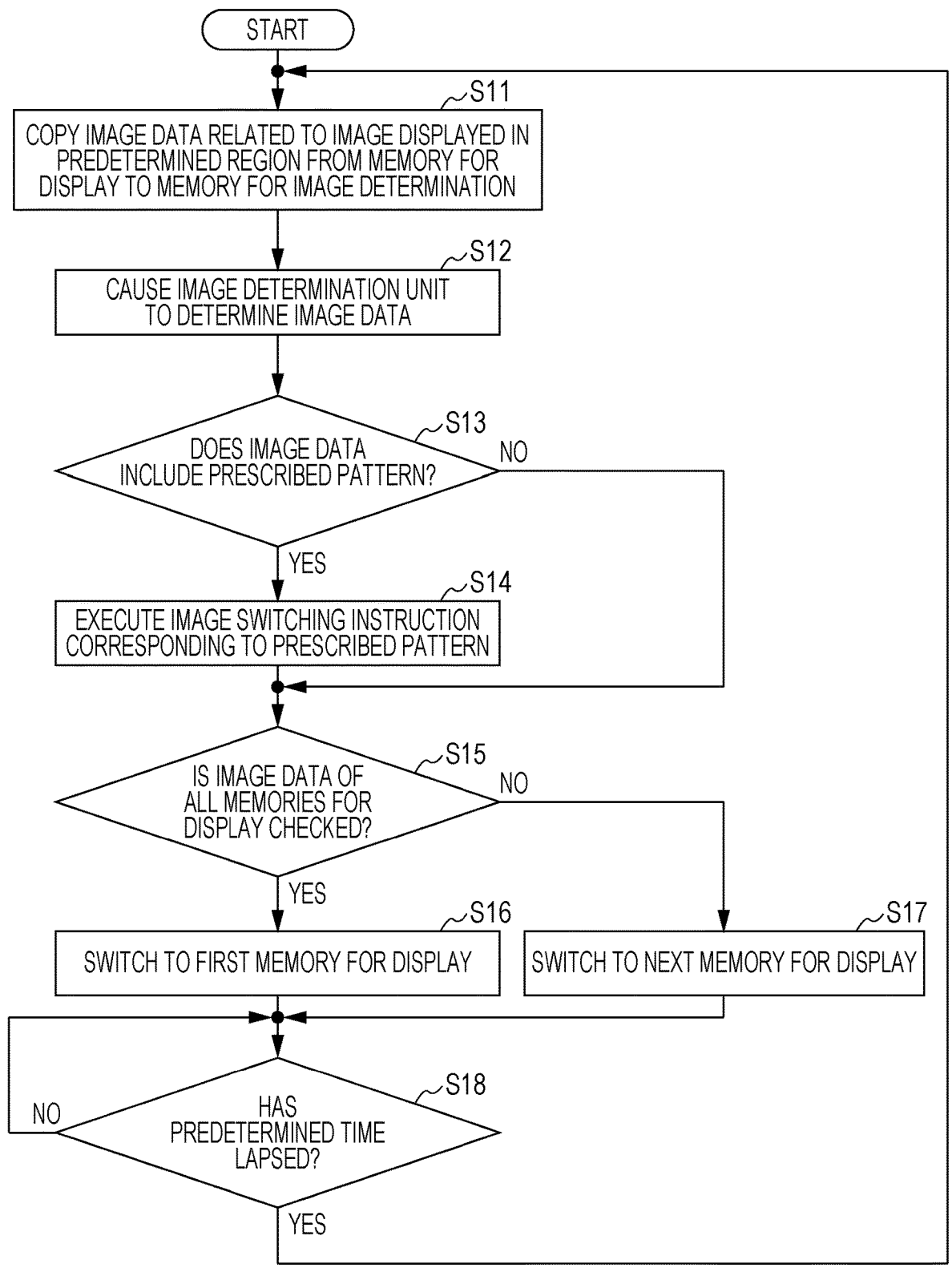
FIG. 6 is a flowchart illustrating procedure of the image switching operation in the image display apparatus for the image to be displayed on the display unit of the image display apparatus according to Embodiment 1 of the disclosure.

FIG. 6 is a flowchart illustrating the procedure of the image switching operation in the image display apparatus 1 for the image to be displayed on the display unit 14 of the image display apparatus 1 according to Embodiment 1 of the disclosure.

At step S11 of FIG. 6, the control unit 10 copies, to the memory for image determination 15, image data related to an image displayed in a predetermined region among pieces of image data stored in the memories for display 12a to 12d (step S11).

Next, at step S12, the control unit 10 causes the image determination unit 16 to determine the image data that is copied to the memory for image determination 15 (step S12).

Then, at step S13, the control unit 10 causes the image determination unit 16 to determine whether or not an image related to the image data includes a prescribed pattern SP that is determined in advance (step S13).

In a case where the prescribed pattern SP that is determined in advance is included (in a case where Yes is determined at step S13), the control unit 10 causes the image processing unit 13 to execute an image switching instruction corresponding to the prescribed pattern SP at step S14 (step S14).

After that, the control unit 10 performs determination of step S15 (step S15).

On the other hand, in a case where the prescribed pattern SP that is determined in advance is not included (in a case where No is determined at step S13), the control unit 10 performs determination of step S15 (step S15).

Next, at step S15, the control unit 10 determines whether or not image data of all the memories for display 12a to 12d to which the external devices 2a to 2d are connected is checked (step S15).

In a case where the image data of all the memories for display 12a to 12d is checked (in a case where Yes is determined at step S15), at step S16, the control unit 10 performs switching to the first memory for display 12a in checking order that is defined as default (step S16). After that, the control unit 10 performs determination of step S18 (step S18).

On the other hand, in a case where the image data of all the memories for display 12a to 12d is not checked (in a case where No is determined at step S15), the control unit 10 performs switching to the next memory for display 12a in the checking order at step S17 (step S17). After that, the control unit 10 performs determination of step S18 (step S18).

Next, at step S18, the control unit 10 determines whether or not a predetermined time (for example, 10 ms to 300 ms etc., after previous checking of image data) has lapsed (step S18).

In a case where the predetermined time has lapsed (in a case where Yes is determined at step S18), the control unit 10 repeats the processing of step S11 (step S11).

On the other hand, in a case where the predetermined time has not lapsed (in a case where No is determined at step S18), the control unit 10 repeats the determination of step S18 (step S18).

In this manner, the control unit 10 regularly causes the image determination unit 16 to determine whether or not image data received from the external devices 2a to 2d includes the prescribed pattern SP and the image processing unit 13 to execute an image switching instruction associated with the prescribed pattern SP.

Thus, it is possible to easily realize the image switching operation of the image display apparatus 1 through image data transmitted from the external devices 2a to 2d to the image display apparatus 1, without using a remote controller for an operation or a special system for a control signal.

Embodiment 2

Next, procedure of an image switching operation in the external device 2 for an image to be displayed on the display unit 14 of the image display apparatus 1 according to Embodiment 2 of the disclosure will be described with reference to FIGS. 7A to 7C.

Figure 7A:
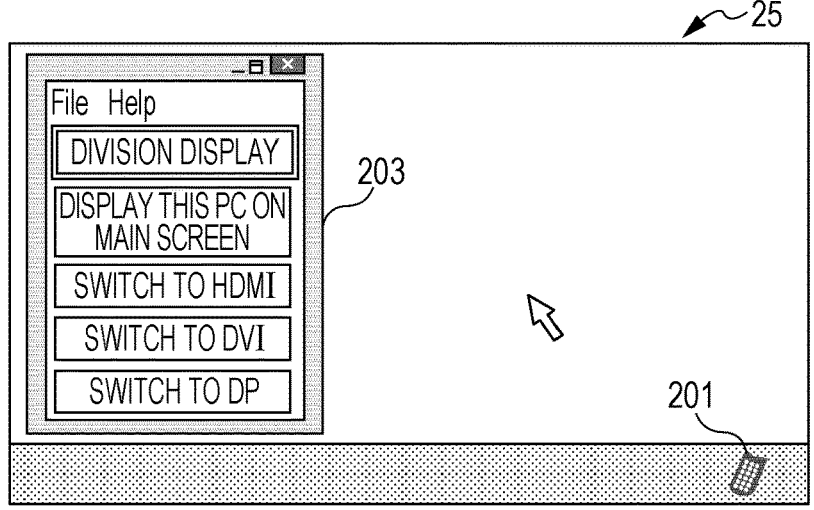
FIGS. 7A to 7C are explanatory views illustrating a specific example of an image switching operation in an external device for an image to be displayed on a display unit of an image display apparatus according to Embodiment 2 of the disclosure and illustrating a series of procedure of the image switching operation in the external device.
Figure 7B:
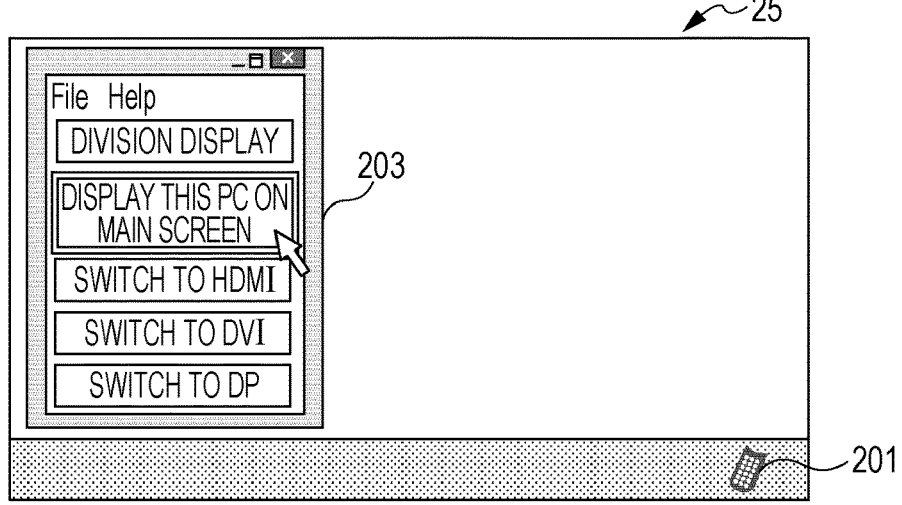
Figure 7C:
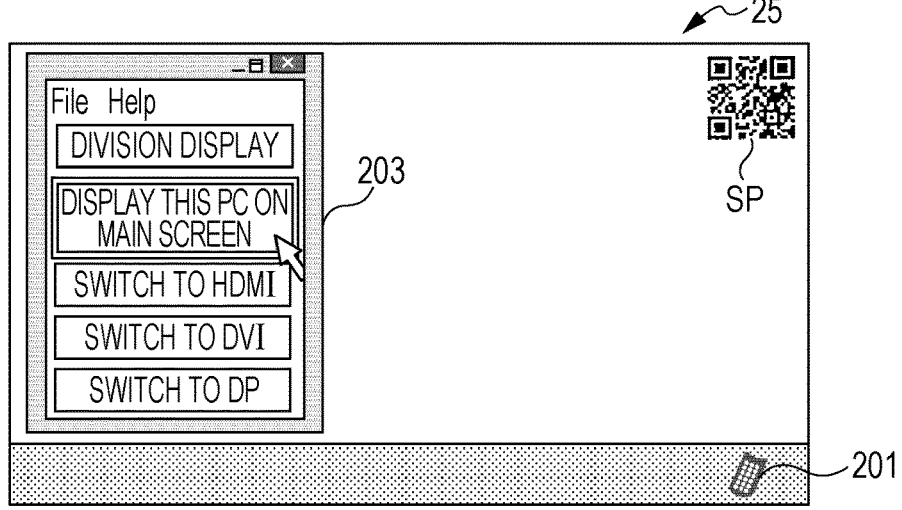

FIGS. 7A to 7C are explanatory views illustrating a specific example of the image switching operation in the external device 2 for the image to be displayed on the display unit 14 of the image display apparatus 1 according to Embodiment 2 of the disclosure. FIGS. 7A to 7C are explanatory views illustrating a series of procedure of the image switching operation in the external device 2.

In Embodiment 1, the list 202 for an operation of the application for switching an input of an image is displayed in the predetermined region of the device display unit 25 in a fixed manner.

On the other hand, in Embodiment 2, as illustrated in FIG. 7A, when the application starts, a list 203 that is able to be moved by dragging is displayed.

When any of items displayed in the list 203 is selected by the user, a prescribed pattern SP corresponding to the item is displayed in an upper right region of the device display unit 25.

Thereby, the user is able to place the list 203 at a free position, thus making it possible to enhance convenience for the user in the image switching operation of the image display apparatus 1.

Note that, in Embodiment 2, the application for switching an input of an image may start by general starting procedure without displaying the icon 201 in the task bar.

Embodiment 3

Next, procedure of an image switching operation in the external device 2 for an image to be displayed on the display unit 14 of the image display apparatus 1 according to Embodiment 3 of the disclosure will be described with reference to FIGS. 8A to 8C.

Figure 8A:
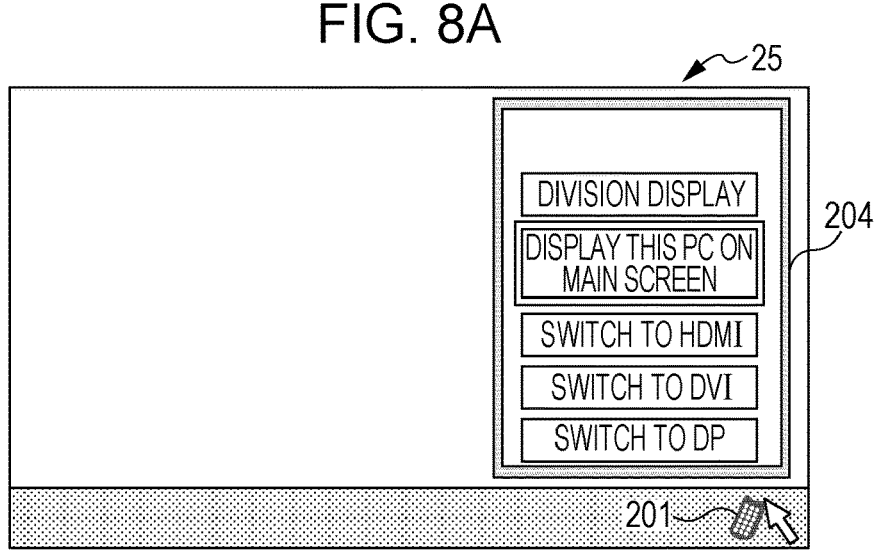
FIGS. 8A to 8C are explanatory views illustrating a specific example of an image switching operation in an external device for an image to be displayed on a display unit of an image display apparatus according to Embodiment 3 of the disclosure and illustrating a series of procedure of the image switching operation in the external device.
Figure 8B:
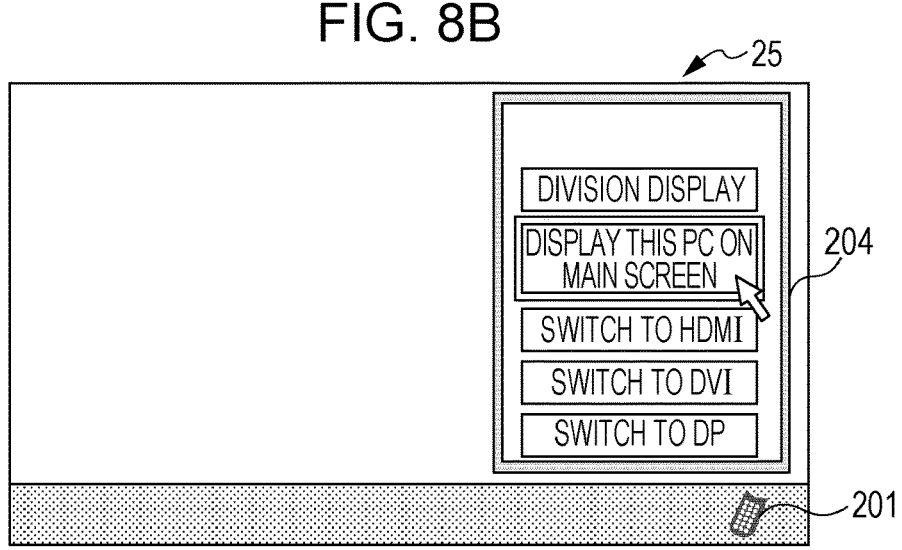
Figure 8C:
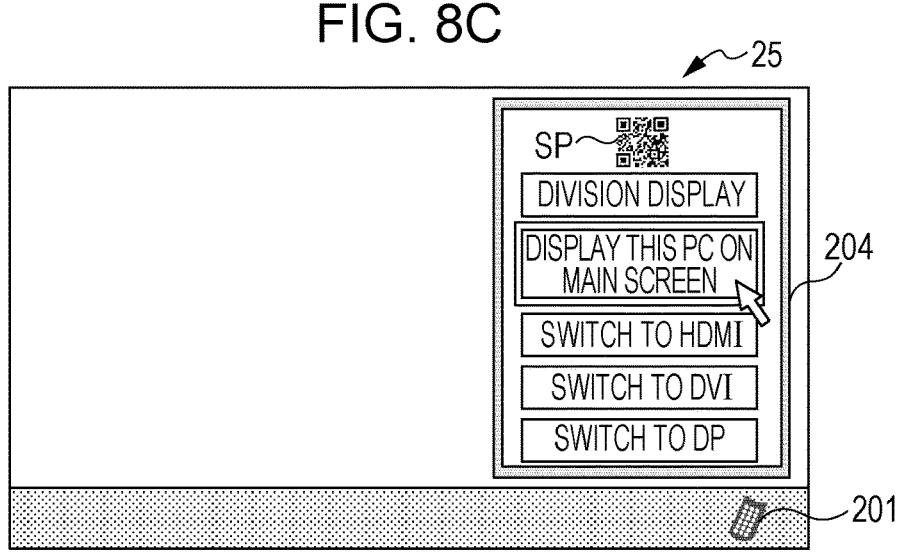

FIGS. 8A to 8C are explanatory views illustrating a specific example of the image switching operation in the external device 2 for the image to be displayed on the display unit 14 of the image display apparatus 1 according to Embodiment 3 of the disclosure. FIGS. 8A to 8C are explanatory views illustrating a series of procedure of the image switching operation in the external device 2.

As illustrated in FIG. 8A, in Embodiment 3, a list 204 for an operation of the application for switching an input of an image is displayed in a predetermined region of the device display unit 25, similarly to Embodiment 1.

A difference from Embodiment 1 lies in that a prescribed pattern SP is displayed in a predetermined region of the list 204 as illustrated in FIG. 8C.

Thereby, since the prescribed pattern SP is displayed in the region of the list 204, there is no possibility that visibility for the list 204 is interfered by display of the prescribed pattern SP, and determination of the prescribed pattern SP is easily performed by the image determination unit 16.

Embodiment 4

In Embodiment 2, in a case where the list 203 moves to the display region of the prescribed pattern SP, a part of the region of the list 203 may be blank and the respective items of the list 203 may be displayed below the blank part so that the prescribed pattern SP does not overlap with the list 203.

Thereby, there is no possibility that visibility for the list 203 is interfered by the prescribed pattern SP being displayed at a position overlapping the respective items of the list 203, and determination of the prescribed pattern SP is easily performed by the image determination unit 16.

Embodiment 5

In Embodiment 2, in a case where the list 203 moves to the display region of the prescribed pattern SP, a display position of the list 203 may be shifted to a region where the list 203 does not overlap with the prescribed pattern SP.

Thereby, since the display position of the list 203 moves to the region where the list 203 does not overlap with the prescribed pattern SP, there is no possibility that visibility for the list 203 is interfered, and determination of the prescribed pattern SP is easily performed by the image determination unit 16.

Embodiment 6

In Embodiments 1 to 5, the list 203 may be temporarily deleted while the prescribed pattern SP is displayed.

Thereby, since the list 203 is deleted while the prescribed pattern SP is displayed, it is possible to avoid a case where it becomes difficult for the image determination unit 16 to determine the prescribed pattern SP due to the list 203 and the prescribed pattern SP being positioned at overlapping positions.

Embodiment 7

At step S14 of FIG. 6, in a case where the control unit 10 causes the image processing unit 13 to execute the image switching instruction corresponding to the prescribed pattern SP, the control unit 10 may not receive an image switching operation for a predetermined time (for example, for one second).

Thereby, it is possible to suppress image switching processing from being frequently performed when image switching operations are performed simultaneously by a plurality of external devices 2.

Moreover, in a case where an image switching operation is performed by a specific external device 2, there is also an effect of suppressing the same processing from being performed redundantly by further executing the processing of steps S11 to 13.

Embodiment 8

The prescribed pattern SP may be displayed in a less visible manner for the user, and examples thereof include a pattern formed of fine dots and a pattern that is displayed for a very short time.

Thereby, since the prescribed pattern SP that is displayed on the device display unit 25 of the external device 2 is made less visible, convenience for the user is enhanced.

Embodiment 9

In Embodiments 1 to 8, considered is a case where an image including a prescribed pattern SP is determined by the image determination unit 16, and on the basis of an image switching instruction associated with the prescribed pattern SP, the image switching instruction is executed.

On the other hand, in Embodiment 9, the external device 2 may generate a prescribed pattern SP of a sound signal with a sine wave, a rectangular wave, or the like, which is associated with an image switching instruction, a sound determination unit provided in the image display apparatus 1 may determine the prescribed pattern SP, and on the basis of the image switching instruction associated with the prescribed pattern SP, the image switching instruction may be executed.

Thereby, since the image switching instruction is able to be transmitted to the image display apparatus 1 from the external device 2 without displaying the prescribed pattern SP on the device display unit 25 of the external device 2, convenience for the user is enhanced.

Aspects of the disclosure also include an aspect in which some of the plurality of aspects described above are combined.

Various modifications of the disclosure may be attained other than the embodiments described above. Such modifications should not be deemed to be out of the scope of the disclosure. The disclosure should include equivalent meanings to the scope of claims, and all of modifications in the scope.

The present disclosure contains subject matter related to that disclosed in Japanese Priority Patent Application JP 2017-080693 filed in the Japan Patent Office on Apr. 14, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A control device that operates an image display apparatus, the control device comprising:
a display unit that displays an image,
an input operation unit that receives an input operation from a user;

a control unit that causes, on a basis of the input operation, the display to display a list in which an item related to an instruction for the image display apparatus is displayed to be selectable, wherein when the input operation unit receives execution of the instruction displayed in the list, the control unit causes to generate the prescribed pattern associated with the instruction in advance, causes to generate a superimposing image in which the prescribed pattern is superimposed with the image, and causes to output image data related to the superimposing image to the image display apparatus, and the control unit prohibits the execution of the instruction to the list for a predetermined time after the image display apparatus outputs the image data related to the superimposing image.

2. The control device according to claim 1, further comprising:

a storage unit that holds an application software for operation of the image display device, wherein the application software generates the prescribed pattern.

3. The control device according to claim 1, wherein the control unit causes to display the prescribed pattern in the display unit at a position which is determined in advance.

4. The control device according to claim 1, wherein the control unit causes to display the prescribed pattern in the display unit at a position which does not overlap with that of the list.

5. The control device according to claim 1, wherein the control unit causes to delete the prescribed pattern after being displayed for a predetermined time on the device display unit.

6. An image display apparatus that connects to the control device to the according to claim 1, the image display apparatus comprising:

an image receiving unit that receives the image data output from the control device, an apparatus display unit that displays the image data, and a setting changing unit that changes a setting based on the instruction indicated by the prescribed pattern when the received the image data included the prescribed pattern associated in advance with the instruction related to the operation of the image display device.

7. A non-transitory recording medium stored a program for causing a computer of a control device that operates an image display apparatus to execute:

displaying an image, receiving an input operation from a user, displaying a list in which an item related to an instruction for the image display apparatus is displayed to be selectable, on a basis of the input operation, when the receiving execution of the instruction displayed in the list, generating the prescribed pattern associated with the instruction in advance and a superimposing image in which the prescribed pattern is superimposed with the image, and outputting image data related to the superimposing image to the image display apparatus, wherein execution of the instruction to the list is prohibited for a predetermined time after the image display apparatus outputs the image data related to the superimposing image.

* * * * *